June 28, 1966 H. RUBELMANN 3,258,612
GATE DRIVE CIRCUIT FOR CONTROL UNIT OF
AUTOMATIC CATHODIC PROTECTION SYSTEM
Filed Feb. 27, 1964
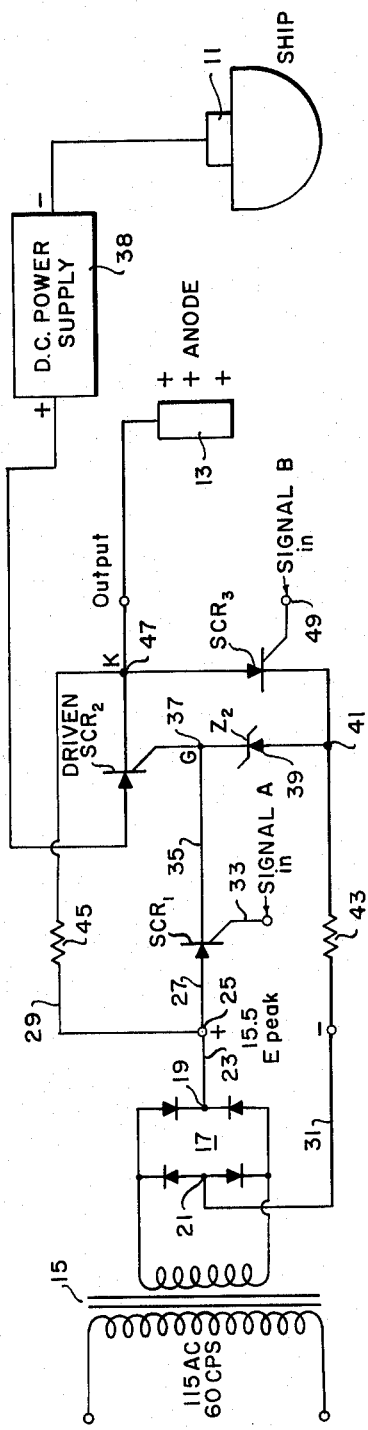
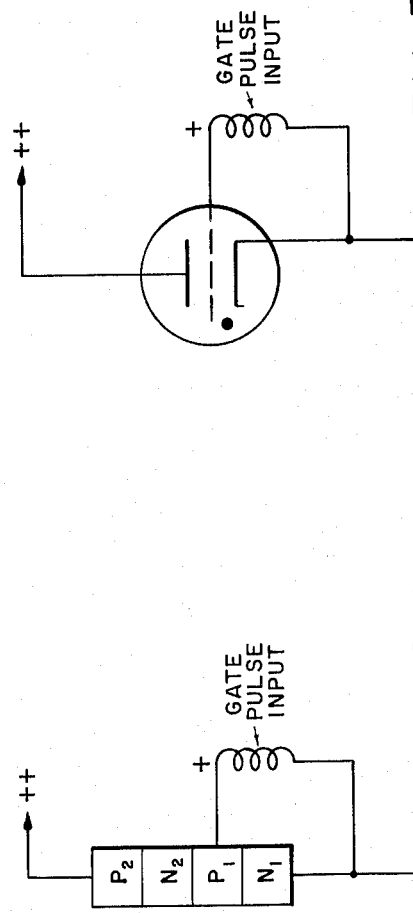
INVENTOR.
HAYDN RUBELMANN
BY *QEHodges*
ATTY.
*Albert Topp*
AGENT.

United States Patent Office 3,258,612
Patented June 28, 1966

3,258,612
GATE DRIVE CIRCUIT FOR CONTROL UNIT OF AUTOMATIC CATHODIC PROTECTION SYSTEM
Haydn Rubelmann, 1201 McDonald Road, Norfolk, Va.
Filed Feb. 27, 1964, Ser. No. 347,963
9 Claims. (Cl. 307—88.5)

The invention described herein may be manufactured and used by or for the Government of the United States of America for governmental purposes without the payment of any royalties thereon or therefor.

The present invention relates to an improved gate drive circuit and more particularly, to an improved high power gate drive circuit which responds to control signals from two different origins and occurring within the same period to provide a single output control utilization signal.

Although the gate drive circuit of the present invention has general utility, it is particularly useful in overcoming a problem in the cathodic protection of ships. That problem is the compensation of control anode voltages when extreme changes in sea water conductivity occur. The need arises to impress on the control anode a pre-salinity compensation control voltage quickly and with sufficient current to prevent over compensation of cathodic protection currents due to sudden radical changes in sea water conductivity. If one of the voltages impressed on the control anode corresponds to the protective current desired, a second voltage may be impressed on the control anode according to changes in sea water conductivity.

This problem is overcome by the unique circuit means of the present invention in which first and second active circuit components such as silicon controlled rectifiers (SCR) (sometimes called NPNP diodes), or thyratrons, are connected in circuit with the gate input of a third silicon controlled rectifier to control the conduction of the third silicon controlled rectifier. The third SCR may provide an output current to modify a ship's cathodic protection circuit. The first SCR may be activated by a gate signal input corresponding to a desired cathodic protection current obtained from sensing the ship's hull potential. The second SCR may be activated by a gate input signal representing local sea water conductivity sensed by a sensing anode or by any other suitable means. By means of the novel circuit of the invention the third or driven SCR will produce an output only when both the first and second SCR's are conducting within a cycle of a pulsating D.C. supply voltage. The voltage compensation may be different for each time cycle. In this manner, the combined effect of two signal input conditions is produced for each cycle on an output device which then applies an accurate compensation signal for cathodic protection currents. If desired, in the more general situation further di-control circuits may be provided to gate the first and second SCR's, and so on, providing a multi-controlled gate system.

Accordingly, it is among the objects of this invention to provide a novel di-controlled gate drive circuit for general utility as well as for particular utility in cathodic protection systems; to provide a novel gate circuit employing silicon controlled rectifiers for high power output, wherein two independent signals may be combined to produce a single output gating control signal during each cycle of a plurality of operating cycles.

The foregoing objects, as well as other objects, features and advantages of the present invention will be better understood by referring to the accompanying drawings in which like numerals represent like parts and in which:

FIG. 1 is a view in schematic diagram form of one version of the present invention; and FIGS. 2 and 3 are views in schematic form of certain circuit elements which may be employed in the circuit of FIG. 1.

Referring to the drawings, the circuit arrangement shown in FIG. 1 provides salinity compensation control between a ship 11 (acting as cathode) and a compensation anode 13. A source of alternating current, such as an ordinary supply at 115 volts A.C., 60 c.p.s., is coupled via a transformer 15 to a full wave rectifier 17.

The rectifier 17 has a positive sense output terminal 19 and a negative sense output terminal 21. At the positive sense terminal 19 unfiltered D.C. pulsations are carried via a lead 23 to a junction point 25 at which the current path is divided into two conductive paths 27 and 29. From the negative sense rectifier terminal 21 a lead 31 provides a common return or reference path for the circuit.

Following the convention of positive current flow, in the path 27 the pulsating D.C. voltage is impressed on the effectively negative or input terminal of a silicon controlled rectifier SCR–1. The silicon controlled rectifier SCR–1 may take the form of a four-element semiconductor device, such as a thyratron transistor or NPNP diode well known in the art. A discussion of such devices may be found on pages 4–18 to 4–21 of "Handbook of Semiconductor Electronics" (Second Edition), by L. P. Hunter, published by McGraw-Hill, 1962. Alternatively, a thyratron may be employed in place of an SCR.

In essence, as shown in FIG. 2, an SCR is a threshold device having four semiconductor bodies which may be arranged (reading in the negative sense to the positive sense direction) as follows: $N_1P_1N_2P_2$. A gating signal source is connected via an inductance L with its negative side connected to the $N_1$ semiconductor and its positive lead connected to the $P_1$ semiconductor body. When and only when a suitable signal gate pulse is present on the inductance L, electrons flow from $N_1$ to $P_1$ causing an avalanche current from $N_1$ to $P_2$. This is similar to the action of a thyratron, shown in FIG. 3 wherein a gate pulse is applied across the grid/cathode, thereby overcoming the tube threshold so that the tube anode conducts a large current.

Returning to FIG. 1, a signal gate pulse "A" for controlling SCR–1 may be applied via an input terminal 33 to cause SCR–1 to conduct.

A lead 35 connects the effective positive output end of the SCR–1 to a junction 37 which forms the input gate signal terminal for a second silicon controlled rectifier, SCR–2— the silicon controlled rectifier to be driven. Compensation current is taken from the output of SCR–2 to regulate current flow for a power supply 38 controlling cathodic protection currents.

A Zener diode 39 is connected between the junction point 37 and a junction point 41 on the return path 31. The Zener diode 39 clamps the base of SCR–2 so that SCR–2 is normally nonconducting. The reference or return path 31 has a resistance 43 connected between the terminal 21 and the junction point 41.

The path 29 is coupled via a resistance 45 to a junction point 47 and thence to the negative sense input end of a silicon controlled rectifier SCR–3. The output end of SCR–3 is connected to the junction point 41 and is controlled by a signal input terminal 49.

It is thus seen that SCR–1 and SCR–3 are located in parallel paths but are effectively connected in series through the driven SCR–2. Consequently, SCR–1 and SCR–3 must be conducting during the same pulsating D.C. cycle before they will together provide sufficient positive-going voltage at junction point 37 to turn on SCR–2. The level for turning on SCR–2 may preferably be located at the avalanche portion of the Zener characteristic curve.

In operation, a signal pulse "A" arriving at the input gate terminal 33 of SCR–1 will cause current to flow thru SCR–1, the Zener diode 39, and the resistance 43. SCR–1 will conduct until the output of the rectifier 17 falls to zero. If SCR–3 receives a signal pulse "B" at terminal 49 during the period SCR–1 is conducting but (before the output of rectifier 17 falls to zero in a given pulsating D.C. cycle), current will flow thru the SCR–3 and resistance 43, thus providing sufficient voltage at junction point 37 to throw SCR–2 into conduction. When SCR–2 conducts, greater current is supplied to the anode 13. The point at which SCR–2 is driven into conduction may be controlled by appropriate selection of the value of resistances 43 and 45 and of the characteristics of Zener diode 39.

If SCR–3 first receives a signal pulse B on its input gate terminal 49 (prior to SCR–1), SCR–3 is caused to conduct, the current flow being thru resistances 43 and 45. Should SCR–1 be driven into conduction while SCR–3 is conducting, sufficient voltage appears at junction point 37 to drive SCR–2 into conduction, thereby controlling the current flow between the cathodic ship 11 and its control anode 13.

By way of example and not of limitation, the circuit components and portions of FIG. 1 may have the following characteristic values:

| | |
|---|---|
| Input supply | 115 v. A.C. |
| Secondary of transformer 17 | 12.6 v. A.C. |
| Peak voltage across 27–31 | 15.5 volts. |
| Resistance 43 | 100 ohms. |
| Resistance 45 | 1000 ohms. |
| SCR–1, SCR–2, SCR–3 | Type C7U. |
| Zener diode 39 | 4.7 volts breakdown back direction. |

Obviously many modifications and variations of the present invention are possible in the light of the above teachings. It is therefore to be understood that within the scope of the appended claims the invention may be practiced otherwise than as specifically described.

What is claimed is:

1. In a cathodic protection system having cathodic protection current supplying means pre-set to govern cathodic protection current flow corresponding to the condition of a surface to be protected, apparatus for modifying said cathodic protection currents in accordance with other than pre-set conditions, comprising:
   first current gating means connected in circuit with the cathodic protection current supplying means;
   said current gating means having a signal controlled input element for controlling the current carrying condition of said current gating means;
   second and third current gating means having respective outputs connected to said signal controlled input element of the first current gating means;
   a source of pulsating D.C. supply connected in circuit with said second and third current gating means and the output end of said first current gating means; and
   signal controlled input means for each of said second and third current gating means for controlling the current carrying characteristics thereof;
   whereby when and only when both said second and third current gating means are driven to conduction within a cycle of supply D.C. pulsation, said first current gating means is driven to conduction to provide current modifying the cathodic protection currents.

2. Apparatus according to claim 1 wherein each of said current gating means comprises a threshold device.

3. Apparatus according to claim 1 wherein said source has a common return, and said apparatus includes bi-directional valve means connected in circuit with the signal controlled input means of said first current gating means, the common return of said source, and the outputs of said second and third current gating means.

4. Apparatus according to claim 2 wherein each of said threshold devices comprises a silicon controlled rectifier.

5. A di-controlled gate circuit comprising:
   a source of pulsating D.C. supply;
   first and second electrically conductive paths connected to said pulsating D.C. supply source;
   each of said first and second paths having a signal gate-controlled threshold device electrically connected therein;
   a common return connected at one end to said supply source and via a resistance to a first junction point at its other end;
   a driven threshold device having a signal gate terminal;
   two way current regulating means;
   said first and a second junction point connected to the respective sides of said two way device;
   means connecting said second junction point to the output of the threshold device in said first path and to the signal gate terminal of said driven threshold device;
   a resistance located in said second path and connected to the input end of the threshold device therein via a third junction point;
   means connecting the output end of said driven threshold device via said third junction point to an output terminal; and
   means connecting the output end of the threshold device of said second path to said first junction point;
   whereby upon occurrence of both the threshold devices in said first and second paths being driven to conduction within a D.C. pulsation cycle, sufficient voltage is produced at said second junction point to drive said driven threshold device into conduction.

6. The circuit according to claim 5 wherein each of said threshold devices comprises a silicon controlled rectifier.

7. The circuit according to claim 6 wherein said two-way valve means comprises a Zener diode.

8. The circuit according to claim 7 and further comprising a cathodic protection anode and a cathode connected in circuit with said driven silicon controlled rectifier.

9. A di-controlled gate circuit comprising:
   a first silicon controlled rectifier to be driven into conduction under certain conditions;
   said first silicon controlled rectifier having an input bias terminal, a gate input terminal and an output terminal;
   a source of D.C. supply;
   a second silicon controlled rectifier having an input bias terminal, a gate input terminal and an output terminal;
   the input bias terminal of said second silicon controlled rectifier being connected to the positive sense output of said D.C. supply;
   means including a resistance connecting the input bias terminal of said second silicon controlled rectifier to the output terminal of said first silicon controlled rectifier;
   a third silicon controlled rectifier having an input bias terminal, gate input terminal and an output terminal;
   means connecting the input bias terminal of said third silicon controlled rectifier to said resistance and to the output terminal of said first silicon controlled rectifier;
   a first junction point connected to the gate input terminal of said first silicon controlled rectifier and to the output terminal of said second silicon controlled rectifier;
   a second junction point; and
   means including two way current regulating valve means connecting said first and second junction points;
   said second junction point being connected to the output terminal of said third silicon controlled rectifier and via a resistance to the negative sense end of said D.C. supply;

whereby upon occurence of signal inputs driving both and only both the second and third silicon controlled rectifiers into conduction within a D.C. pulsation cycle, the combined voltages appearing at said first junction point are additive to drive said first silicon controlled rectifier into conduction.

No references cited.

ARTHUR GAUSS, *Primary Examiner.*

D. D. FORRER, *Assistant Examiner.*